Figure 1:
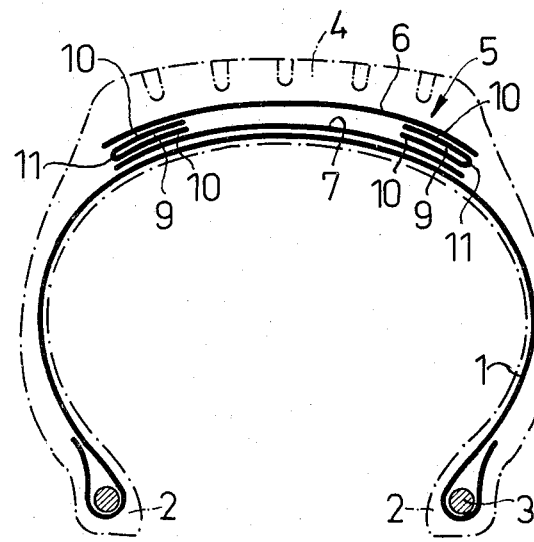

United States Patent

Twardzik

[15] 3,664,404
[45] May 23, 1972

[54] PNEUMATIC VEHICLE TIRE

[72] Inventor: Georg Twardzik, Marienhagen, Germany

[73] Assignee: Continental Gummi-Werke Aktiengesellschaft, Hannover, Germany

[22] Filed: June 8, 1970

[21] Appl. No.: 44,061

[30] Foreign Application Priority Data

June 9, 1969 Germany...................P 19 29 174.8

[52] U.S. Cl............................................................152/361
[51] Int. Cl..........................................................B60c 9/20
[58] Field of Search....................................................152/361

[56] References Cited

UNITED STATES PATENTS 3,404,721 10/1968 Massoubre............................152/361
3,357,470 12/1967 Massoubre............................152/361

*Primary Examiner*—Arthur L. La Point
*Assistant Examiner*—Robert Saifer
*Attorney*—Walter Becker

[57] ABSTRACT

A pneumatic tire with a belt extending over the width of the tread strip and comprising two superimposed laterally free ending steel wire layers with the strength members of one of said layers extending in one inclined direction and with the strength members of the other one of said layers extending in the oppositely inclined direction while between said two cord fabric layers of the belt within the marginal regions thereof there are interposed folded textile cord fabric layers, the strength members of said steel wire layers and the strength members of the respective adjacent folded over sections being inclined in the same direction.

1 Claim, 2 Drawing Figures

INVENTOR
GEORG TWARDZIK

PNEUMATIC VEHICLE TIRE

The present invention concerns a pneumatic vehicle tire with a pull-resistant belt extending substantially over the width of the tread strip and provided with two superimposed laterally free cord fabric layers in which the strength carriers of one layer extend in one inclined direction whereas the strength carriers of the other layer extend in the other inclined direction, between the two belt layers within the region of each belt marginal portion a cord fabric layer doubled by folding being so arranged that the strength carriers of said cord fabric layer extend in both superimposed sections at an angle with regard to the tire circumferential direction.

Particularly with pneumatic vehicle tires of the above referred to type which are produced from raw tires made in conformity with the flat band method and are later curved as a unit, the strength carriers of the belt and of the carcass affect each other. This mutual influence of the strength carriers brings about that with the finished tire the strength carriers of the belt no longer extend rectilinearly or about rectilinearly from one belt marginal portion to the other but follow an almost S-shaped course in such a way that the ends of the individual strength carriers within the region of the marginal portions of the belt are inclined toward the beads or more toward the transverse direction of the tire. This situation may lead to a considerable reduction in the lateral stabilizing effect of the belt.

It is known to arrange the cord fabric layers doubled by folding between the two cord fabric layers of the belt in such a way that the strength carriers of the belt cross with the interposed cord fabric layers. This kind of arrangement does, however, not prevent the above mentioned unfavorable effect exerted by the strength carriers forming the belt.

It is, therefore, an object of the present invention to provide a pneumatic vehicle tire which will overcome the above mentioned drawbacks so that the above referred to disadvantageous mutual influence of the cord fabric layers of the belt will be eliminated.

It is another object of this invention to secure the rectilinear or practically rectilinear course of the strength carriers of the cord fabric layers of the belt also when the strength carriers of these layers have free ends, in other words, when cord fabric layers with open cut edges are to be employed, and during the manufacture of the tire a mutual influence of the strength carriers of the belt and of the carcass cannot be avoided when it is necessary to produce the raw tire as a cylindrical body and this cylindrical body has subsequently as a unit to be curved.

These and other objects and advantages of the invention will appear more clearly from the following specification in connection with the accompanying drawing, in which:

FIG. 1 diagrammatically illustrates a radial section through a pneumatic vehicle tire according to the invention.

Figure 2:
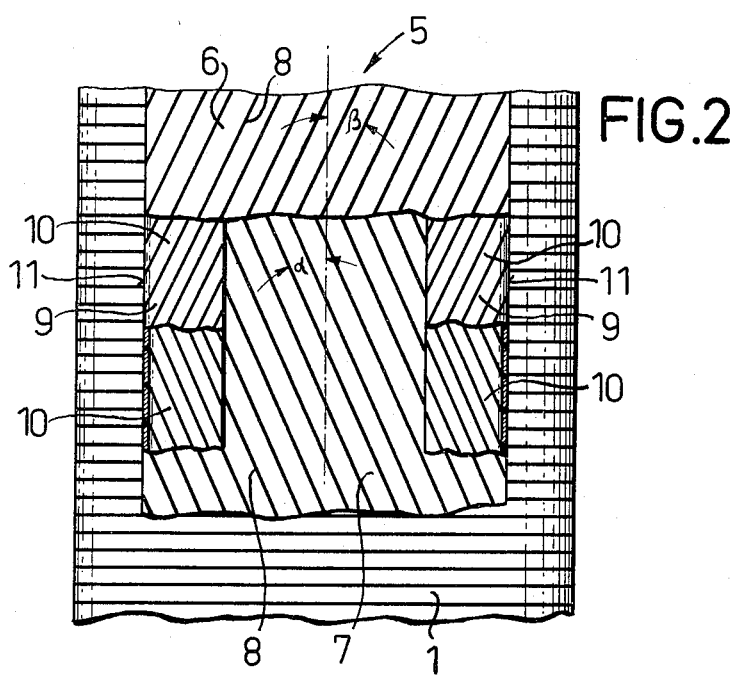

FIG. 2 is a portion of a top view of the tire of FIG. 1 with emphasis on its reinforcing inserts.

The above outlined objects have been realized by a pneumatic vehicle tire according to the invention which is characterized in that, on one hand, the strength carriers of the two cord fabric layers and, on the other hand, the cord fabric layers located adjacent thereto and doubled by folding extend in the same inclined direction.

In view of these strength carriers which ascend at an incline in the same direction, which strength carriers may preferably be arranged parallel to each other, a mutual support of the individual strength carriers is obtained so that the danger of an undesired deformation of the strength carriers of the belt, for all practical purposes, will be eliminated. It is true that the strength carriers of the belt cannot be prevented from affecting the strength carriers of the carcass. However, since the strength carriers of the two cord fabric layers of the belt, particularly within the region of their ends, may rest against strength carriers extending in the same direction or being parallel to each other and pertaining to the interposed doubled cord fabric layers, the above mentioned undesired change in the location of the strength carriers of the belt will be prevented.

Referring now to the drawing in detail, the tire body built up of rubber or rubber-like synthetic material is reinforced by a carcass 1 which includes pull-resistant threads or the like extending at a right angle or nearly right angle with regard to the tire circumferential direction. These threads or the like extend uninterruptedly from one bead 2 to the other bead 2 and are anchored at the beads by being looped around the bead cores 3.

In the vicinity of and above the carcass 1 there is provided a belt 5 which extends substantially over the width of the tread strip 4 and is pull-resistant in the circumferential direction of the tire while bringing about a lateral stabilization of the tire. The belt 5 is formed by two superimposed cord fabric layers 6, 7 which determine the width of the belt 5 and are built up of strength carriers 8 which in their position are parallel to each other. The strength carriers 8 of the cord fabric layer 6 are, however, inclined toward the right with regard to the drawing, whereas the strength carriers 8 of the cord fabric layer 7 are inclined in the opposite direction. The angles $\alpha$, $\beta$ which are formed by the strength carriers 8 with the circumferential direction of the tire are preferably of the same magnitude with regard to the two cord fabric layers 6, 7. These angles amount to from about 15° to 25°. The marginal areas of the belt are formed by open cut edges of the cord fabric layers 6 and 7. Thus, the cord fabric layers 6 and 7 end freely toward the side and, accordingly, are not doubled in the region of the belt marginal areas by folding toward the central plane of the tire.

Between the two cord fabric layers 6 and 7 at each marginal area of the belt there is provided a further cord fabric layer 9. The layer 9 is doubled so as to form two sections 10 which extend approximately over one third of the width of the belt 5 in such a way that the folding area 11 is located outwardly. The strength carriers 10 of this cord fabric layer 9 extend in conformity with FIG. 2 of the drawing. That section 10, which in FIG. 1 is the upper section, also has strength carriers which extend parallel to the strength carriers 8 of the cord fabric layer 6, whereas, correspondingly, the strength carriers of the lower section 10 are parallel to the strength carriers 8 of the cord fabric layer 7.

In combination with the laterally outwardly located folding areas 11, the strength carriers extending parallel to the adjacent strength carriers 8 will over the sections 10 have the contributing effect that distorsions of the strength carriers 8 will be prevented and that, after the curving of the raw tire, the strength carriers 8 will, as shown in FIG. 2, extend nearly rectilinearly after the tire has been pressed and vulcanized. The strength carriers 8 within the region of the belt margin are so to speak stiffened and held in their position.

The arrangement according to the invention of the cord fabric layers 9 is particularly suitable for such cord fabric layers 6 and 7 the strength carriers of which consist of a stiff material, such as steel. However, generally it is sufficient that the cord fabric layers 9 are made of easily foldable layers, for instance, of textile layers.

It is, of course, to be understood that the present invention is, by no means, limited to the particular structure shown in the drawing. Thus, while the drawing shows only one carcass layer and while for the belt 5 only one cord fabric layer is provided with two layers 6 and 7, it is also possible for the carcass as well as for the belt 5 to provide further layers or pairs of layers. It may also be mentioned that the width of the section 10 may be so selected that it corresponds to about half the width of the belt.

What I claim is:

1. A pneumatic tire with side walls and a tread strip, which includes: a pull-resistant belt arranged inwardly of said tread strip and comprising two superimposed cord fabric layers with open cut edges and comprising strength members and having a width corresponding to the width of said belt, the strength carriers of one of said layers extending substantially parallel to each other and at the same inclination with regard to the circumferential direction of the tire and the strength carriers of the other one of said layers extending substantially parallel to each other but inclined in a direction opposite to the direction of inclination of the strength members of said first mentioned layer, folded over cord fabric layer means interposed between the marginal areas of said layers and each having a U-form with free ends pointing toward each other and having their apeces pointing outwardly toward the respective adjacent tire side wall, the folded over sections of each of said folded layer means having their strength members extend at an inclination with regard to the circumferential direction of the tire, and carcass means arranged radially inwardly of said belt and comprising strength members extending at least nearly at a right angle with regard to the circumferential direction of the tire, the strength members of said cord fabric layers and the strength members of the respective adjacent folded over sections being inclined in the same direction, the strength members of said two cord fabric layers and the strength members of said folded over sections being practically parallel to each other, the strength carriers of said cord fabric layers being relatively stiff steel wires, and the strength carriers of said folded over sections consisting of relatively soft textile material only to aid during fabrication while having good bending properties similar to those of said steel wires and avoiding edge stiffening in the pneumatic tire.

* * * * *